US010275631B2

(12) United States Patent
Tseng et al.

(10) Patent No.: US 10,275,631 B2
(45) Date of Patent: Apr. 30, 2019

(54) ELECTRONIC DEVICE AND PHYSIOLOGICAL CHARACTERISTIC IDENTIFYING MODULE

(71) Applicant: HTC Corporation, Taoyuan (TW)

(72) Inventors: Chun Tseng, Taoyuan (TW); Shih-Po Chien, Taoyuan (TW); Chi-Jer Wang, Taoyuan (TW)

(73) Assignee: HTC Corporation, Toayuan (TW)

( * ) Notice: Subject to any disclaimer, the term of this patent is extended or adjusted under 35 U.S.C. 154(b) by 37 days.

(21) Appl. No.: 14/948,379

(22) Filed: Nov. 22, 2015

(65) Prior Publication Data

US 2017/0147849 A1 May 25, 2017

(51) Int. Cl.
*G06K 9/00* (2006.01)

(52) U.S. Cl.
CPC ....... *G06K 9/0002* (2013.01); *G06K 9/00053* (2013.01)

(58) Field of Classification Search
CPC .. G06K 9/0002; G06K 9/00053; H01L 23/10; H01L 23/562; H01L 2924/0002
See application file for complete search history.

(56) References Cited

U.S. PATENT DOCUMENTS

| | | | | |
|---|---|---|---|---|
| 2005/0063571 A1* | 3/2005 | Setlak | ................ | G06K 9/00013 382/124 |
| 2010/0010853 A1* | 1/2010 | Yano | ...................... | G06Q 10/06 705/7.27 |
| 2010/0101853 A1* | 4/2010 | McNutt | .................. | H01B 13/26 174/350 |
| 2011/0309482 A1 | 12/2011 | Salatino et al. | | |
| 2013/0307818 A1* | 11/2013 | Pope | ....................... | G06F 3/044 345/174 |
| 2015/0071509 A1* | 3/2015 | Myers | .................. | G06K 9/0002 382/124 |
| 2015/0136819 A1* | 5/2015 | Yang | ...................... | A45C 11/00 224/191 |

(Continued)

FOREIGN PATENT DOCUMENTS

| | | |
|---|---|---|
| CN | 101490852 | 7/2009 |
| CN | 104836522 | 8/2015 |

OTHER PUBLICATIONS

"Office Action of China Counterpart Application," dated Nov. 5, 2018, pp. 1-8.

*Primary Examiner* — Mekonen T Bekele
(74) *Attorney, Agent, or Firm* — JCIPRNET

(57) ABSTRACT

An electronic device and a physiological characteristic identifying module are provided. The electronic device includes a case, a physiological characteristic identifying element, a cover plate, a key cap, and an insulating static electricity shielding ring. The case has a first hole. The physiological characteristic identifying element is disposed in the first hole. The cover plate is disposed on the case and has a second hole. At least a portion of an upper surface of the physiological characteristic identifying element is exposed by the second hole. The key cap is disposed in the second hole and located above the upper surface. The insulating static electricity shielding ring is disposed on the rim of the physiological characteristic identifying element and covers an outer portion of the upper surface and at least a portion of a lateral surface of the physiological characteristic identifying element.

5 Claims, 2 Drawing Sheets

(56) References Cited

U.S. PATENT DOCUMENTS

2016/0239150 A1* 8/2016 Lee .................... G06K 9/00013
2016/0278671 A1* 9/2016 Bhagavat ............. A61B 5/1172
2017/0061189 A1* 3/2017 Kwon .................. G06K 9/0002

* cited by examiner

ELECTRONIC DEVICE AND PHYSIOLOGICAL CHARACTERISTIC IDENTIFYING MODULE

BACKGROUND OF THE INVENTION

Field of the Invention

The invention relates to an electronic device and a characteristic identifying module, and particularly relates to an electronic device and a physiological characteristic identifying module.

Description of Related Art

In recent years, as the technology industries advance, electronic devices, such as laptop computers, tablet computers, and mobile phones, have been extensively used in our daily life. The electronic devices are developed into more forms and have more functions, and the convenience and practicability brought by the electronic devices make them popular. As the users rely more on the electronic devices than ever, the safety of the data stored in the electronic devices becomes an important issue. Regarding this, now some electronic devices are provided with a fingerprint identifying element as measures of data protection.

However, the fingerprint identifying element may be easily damaged by static electricity. The protection measures currently taken are to dispose a metal ring on the outer edge of the fingerprint identifying element to discharge the static electricity, so as to protect the fingerprint identifying element. Nevertheless, use of the metal ring will result in increase of the material cost and manufacturing cost.

SUMMARY OF THE INVENTION

The invention provides an electronic device and a physiological characteristic identifying module for lowering the costs in comparison with the conventional technology that uses a metal ring for static electricity protection.

The electronic device of the invention includes a case, a physiological characteristic identifying element, a cover plate, a key cap, and an insulating static electricity shielding ring. The case has a first hole. The physiological characteristic identifying element is disposed in the first hole. The cover plate is disposed on the case and has a second hole. At least a portion of an upper surface of the physiological characteristic identifying element is exposed by the second hole. The key cap is disposed in the second hole and located above the upper surface. The insulating static electricity shielding ring is disposed on a rim of the physiological characteristic identifying element and covers an outer portion of the upper surface and at least a portion of a lateral surface of the physiological characteristic identifying element.

The physiological characteristic identifying module of the invention is adapted to be installed in an electronic device and includes a physiological characteristic identifying element, a key cap, and an insulating static electricity shielding ring. The physiological characteristic identifying element is disposed in a first hole of a case of the electronic device. The key cap is disposed in a second hole of a cover plate of the electronic device and located above an upper surface of the physiological characteristic identifying element. At least a portion of the upper surface is exposed by the second hole. The insulating static electricity shielding ring is disposed on a rim of the physiological characteristic identifying element and covers an outer portion of the upper surface and at least a portion of a lateral surface of the physiological characteristic identifying element.

Based on the above, in the electronic device and the physiological characteristic identifying module of the invention, a low-cost insulating static electricity shielding ring is used for static electricity protection.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
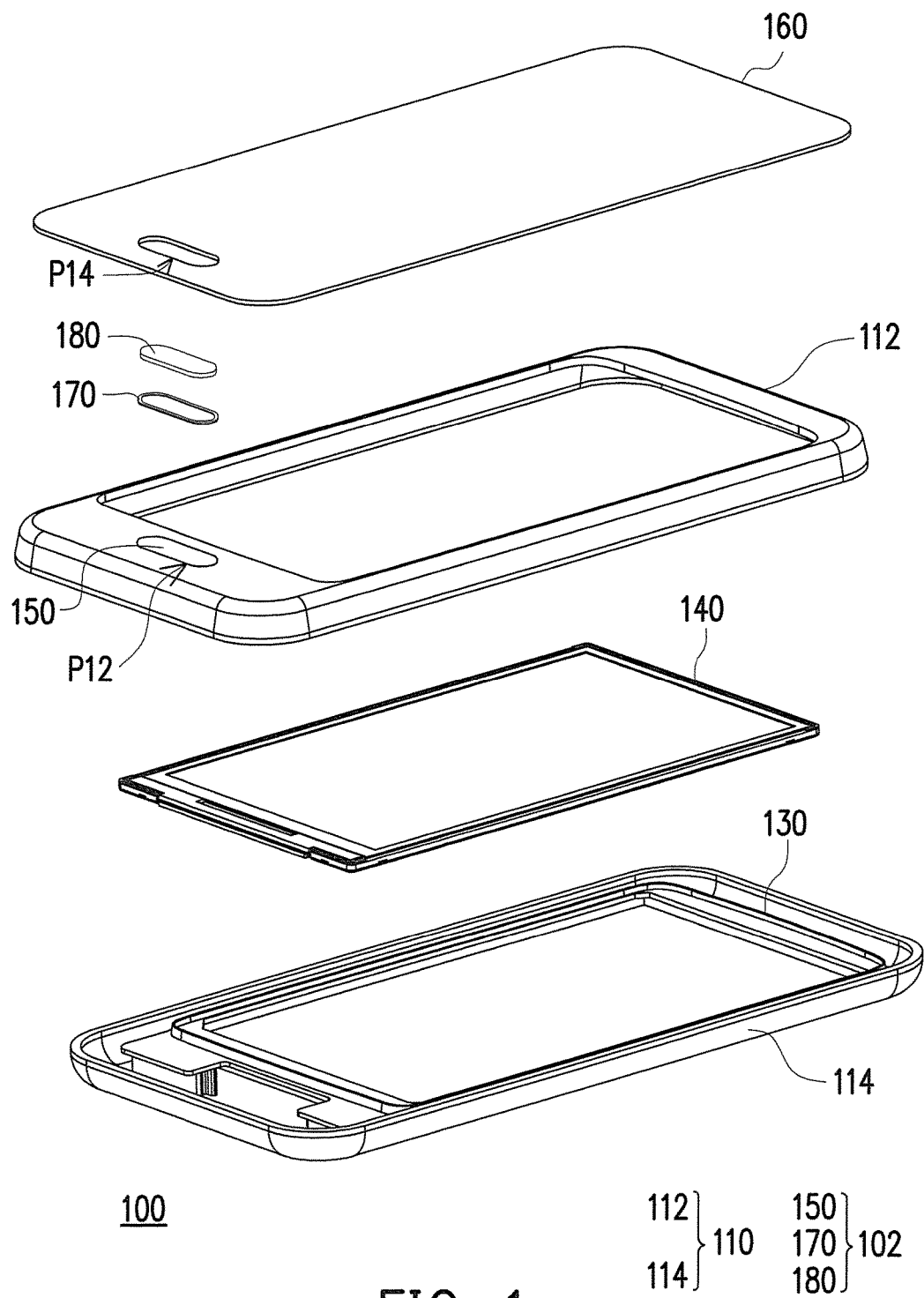
FIG. 1 is a schematic exploded view of an electronic device according to an embodiment of the invention.

FIG. 1 is a schematic exploded view of an electronic device according to an embodiment of the invention. Referring to FIG. 1, in this embodiment, an electronic device 100 includes a front cover 112, a rear cover 114, a frame 130, a display module 140, a physiological characteristic identifying element 150, a cover plate 160, an insulating static electricity shielding ring 170, and a key cap 180. The front cover 112 and the rear cover 114 may constitute a case 110 of the electronic device 100. The physiological characteristic identifying element 150, the key cap 170, and the insulating static electricity shielding ring 180 may constitute a physiological characteristic identifying module 102 in an embodiment of the invention. The electronic device 100 of this embodiment is a smart phone, for example. Nevertheless, the electronic device of the invention may also be a tablet computer or other electronic devices. The display module 140 of this embodiment may be used simply for displaying images, or may further have a touch function.

Figure 2:
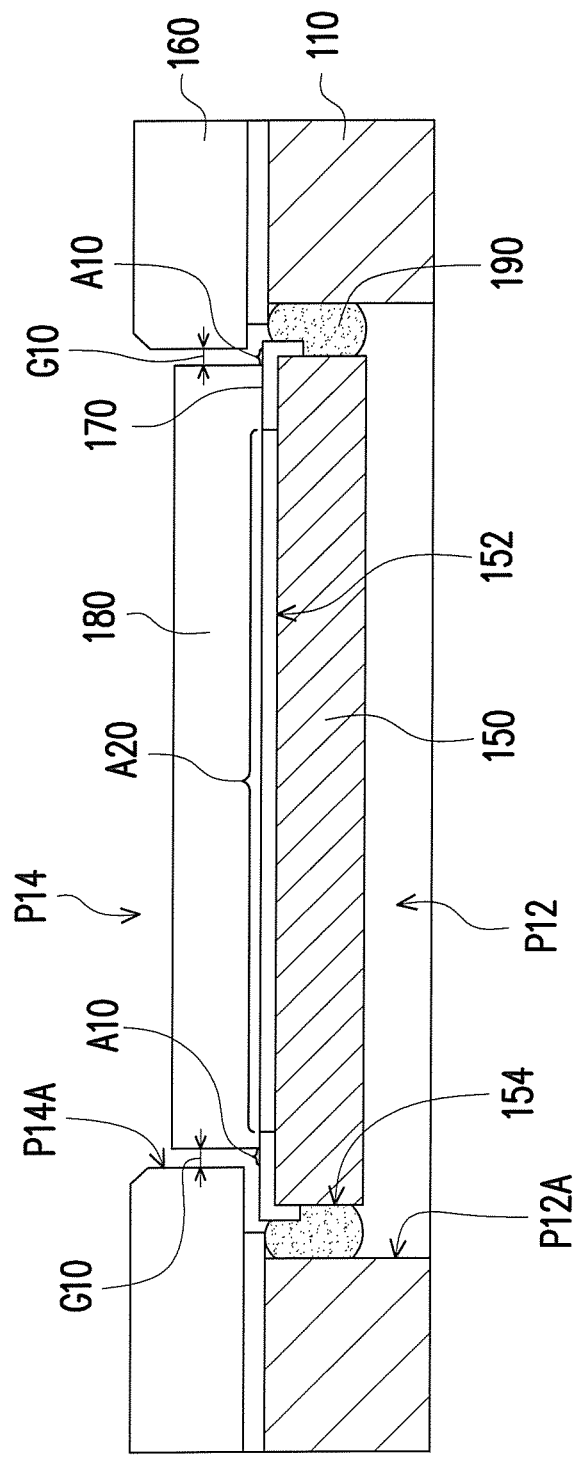
FIG. 2 is a schematic cross-sectional view of a part of the electronic device of FIG. 1 where a physiological characteristic identifying module is disposed.

FIG. 2 is a schematic cross-sectional view of a part of the electronic device of FIG. 1 where the physiological characteristic identifying module is disposed. Referring to FIG. 1 and FIG. 2, the front cover 112 of the case 110 has a first hole P12. The physiological characteristic identifying element 150 is disposed in the first hole P12. The cover plate 160 is disposed on the case 110 and has a second hole P14. The second hole P14 exposes at least a portion of an upper surface 152 of the physiological characteristic identifying element 150. The key cap 180 is disposed in the second hole P14 and located above the upper surface 152. The key cap 180 may protect the physiological characteristic identifying element 150 from damage caused by an external force and also block static electricity to protect a portion of the physiological characteristic identifying element 150 under the key cap 180. The insulating static electricity shielding ring 170 is disposed on a rim of the physiological characteristic identifying element 150. That is to say, the insulating static electricity shielding ring 170 is disposed on an edge of the physiological characteristic identifying element 150, but not necessarily on the entire edge. Meanwhile, the insulating static electricity shielding ring 170 also covers an outer portion of the upper surface 152 of the physiological characteristic identifying element 150, but likewise, not necessarily covering the entire outer portion. Moreover, the insulating static electricity shielding ring 170 further covers at least a portion of a lateral surface 154 of the physiological characteristic identifying element 150. The insulating static electricity shielding ring 170 has a substantially L-shaped cross section, for example.

An orthographic projection A10 of a gap G10 between the key cap 180 and a hole wall P14A of the second hole P14 of the cover plate 160 on the upper surface 152 completely avoids an area A20 of the upper surface 152, which is not covered by the insulating static electricity shielding ring 170, for example. In other words, when the appearance of the electronic device 100 is observed, the upper surface 152 of the physiological characteristic identifying element 150 cannot be seen because the portion of the upper surface 152 exposed by the gap G10 is covered by the insulating static electricity shielding ring 170. When excessive electrostatic charge has accumulated on the outer surface of the electronic device 100 or been received from the outside to cause electrostatic discharge, the key cap 180 and the cover plate 160 prevent static electricity from entering the electronic device 100, but the static electricity may still enter the electronic device 100 through the gap G10. Since the insulating static electricity shielding ring 170 shields off the static electricity, the physiological characteristic identifying element 150 is protected from damage of the static electricity. Moreover, the insulating static electricity shielding ring 170 includes a non-metal material. Thus, the material cost is low and the manufacturing process thereof costs less.

For example, a resistance value of the insulating static electricity shielding ring 170 is greater than $10^9 \Omega$. Thus, electrostatic discharge may be prevented under most circumstances. The physiological characteristic identifying element 150 of this embodiment is a fingerprint identifying element, but the invention is not limited thereto. The invention may be applied to any physiological characteristic identifying element that requires electrostatic discharge protection. In addition, the fingerprint identifying element may be implemented by various sensing elements, such as a capacitive fingerprint identifying element and an optical fingerprint identifying element. A mechanical button (not shown) may be provided under the physiological characteristic identifying element 150, so as to utilize the space more efficiently to provide multiple functions. The electronic device 100 of this embodiment may further include a waterproof glue 190 applied between the lateral surface 154 of the physiological characteristic identifying element 150 and the hole wall P12A of the first hole P12 and between the insulating static electricity shielding ring 170 and the hole wall P12A of the first hole P12. Thereby, the static electricity protection capability of the electronic device 100 is further improved, and the waterproof performance of the electronic device 100 is enhanced as well.

To sum up, in the electronic device and the physiological characteristic identifying module of the invention, the insulating static electricity shielding ring is disposed to achieve static electricity protection. Accordingly, the material and manufacturing costs required for static electricity protection are reduced.

It will be apparent to those skilled in the art that various modifications and variations can be made to the disclosed embodiments without departing from the scope or spirit of the invention. In view of the foregoing, it is intended that the invention covers modifications and variations provided that they fall within the scope of the following claims and their equivalents.

What is claimed is:

1. An electronic device, comprising:
   a case comprising a first hole;
   a physiological characteristic identifying element disposed in the first hole;
   a cover plate disposed on the case and comprising a second hole, wherein the second hole exposes at least a portion of an upper surface of the physiological characteristic identifying element;
   a key cap disposed in the second hole and located above the upper surface; and
   an insulating static electricity shielding ring disposed on a rim of the physiological characteristic identifying element and covering an outer portion of the upper surface and at least a portion of a lateral surface of the physiological characteristic identifying element, wherein the lateral surface and the upper surface are located on different planes, and
   wherein an orthographic projection of a gap between the key cap and a hole wall of the second hole on the upper surface completely avoids an area of the upper surface that is not covered by the insulating static electricity shielding ring.

2. The electronic device according to claim 1, wherein a resistance value of the insulating static electricity shielding ring is greater than $10^9 \Omega$.

3. The electronic device according to claim 1, further comprising a waterproof glue applied between the lateral surface and a hole wall of the first hole and between the insulating static electricity shielding ring and the hole wall of the first hole.

4. The electronic device according to claim 1, wherein the physiological characteristic identifying element is a fingerprint identifying element.

5. The electronic device according to claim 4, wherein the fingerprint identifying element is a capacitive fingerprint identifying element.

* * * * *